United States Patent [19]

Ihle

[11] 4,056,994
[45] Nov. 8, 1977

[54] FLYING SHEAR FOR THE CROSSCUTTING OF METAL STRIPS OR BANDS

[75] Inventor: Josef Ihle, Pforzheim, Germany

[73] Assignee: Irma Ungerer geb. Dollinger, Germany

[21] Appl. No.: 725,109

[22] Filed: Sept. 21, 1976

[30] Foreign Application Priority Data

Nov. 5, 1975 Germany .............................. 2549481

[51] Int. Cl.² ............................................. B26D 1/56
[52] U.S. Cl. ..................................... 83/311; 83/315; 83/327; 83/328; 74/600
[58] Field of Search .................. 83/311, 315, 328, 327; 74/600

[56] References Cited

U.S. PATENT DOCUMENTS

| 2,843,202 | 7/1958 | Hallden | 83/315 X |
| 3,672,242 | 6/1972 | Fritz | 74/600 |
| 3,916,745 | 11/1975 | Strohmeier et al. | 83/311 |

*Primary Examiner*—Donald R. Schran
*Attorney, Agent, or Firm*—McGlew and Tuttle

[57] ABSTRACT

The flying shear is designed as a crank rocker shear for crosscutting metal strips continuously fed thereto, with the crank effecting entrainment of strip cutting knives in the direction of strip movement and return of the knives in the opposite direction, and with the crank radius being adjustable in accordance with different cutting lengths of the strip. A cylindrical drum is rotatably mounted in the shear frame, and the crank axle is mounted within the drum to extend parallel to the axis thereof and for adjustment radially of the drum. Cooperating wedge surfaces are provided on the inner surface of the drum and on the crank axle, and the wedges on the crank axle are adjustable by a threaded spindle, having right hand and left hand threads, threaded through the wedges and rotatable, to adjust the crank radius, by a hydraulic motor. Hydraulically operated piston-cylinder actuators are effective between the inner surface of the drum and the crank axle to maintain the cooperating wedges firmly engaged with each other, and the radius adjusting mechanism rotates as a unit with the cylindrical drum which constitutes a crank shaft. A hydraulically operated mechanical clamp is effective to lock the threaded shaft against movement after adjustment of the crank radius.

9 Claims, 4 Drawing Figures

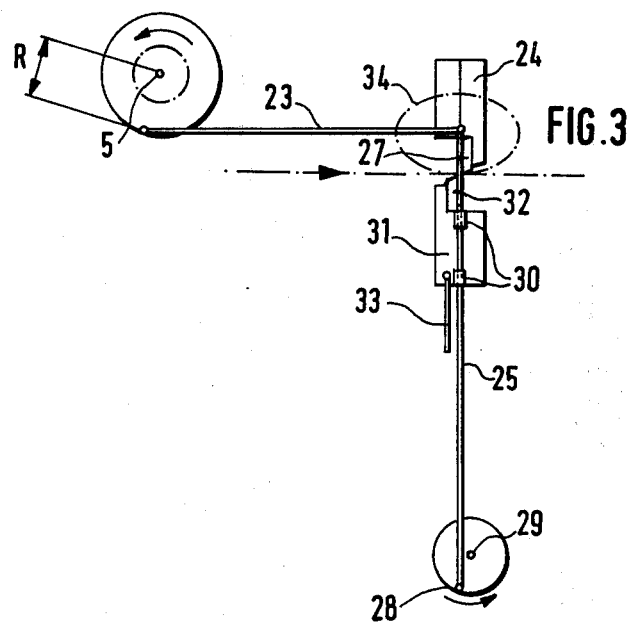
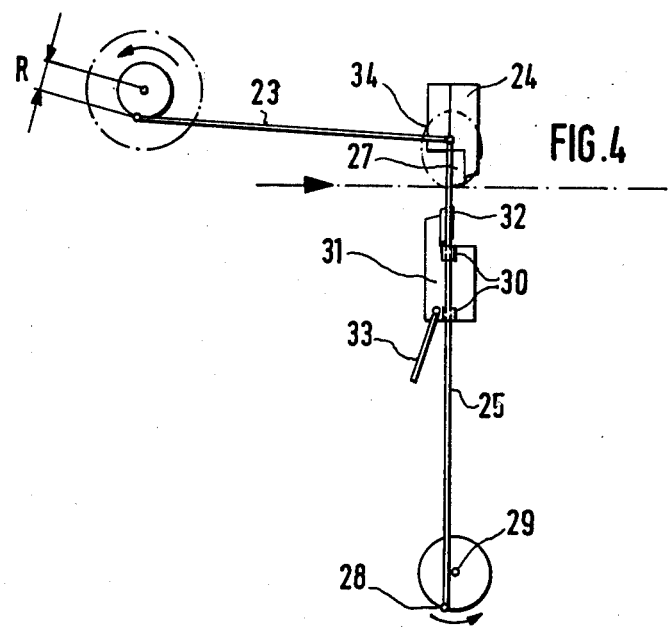

FLYING SHEAR FOR THE CROSSCUTTING OF METAL STRIPS OR BANDS

FIELD AND BACKGROUND OF THE INVENTION

This invention relates to a flying shear designed as a crank rocker shear for the crosscutting of metal strips continuously fed thereto, and wherein, for the purpose of adjusting for different cutting lengths, the radius of the crank, which causes entrainment of the cutting knives in the direction of strip movement and their return, is adjustable.

DESCRIPTION OF THE PRIOR ART

Shears of this type are known, for example, from German Pat. No. 2,320,509 and German Pat. No. 1,627,288, mentioned therein. In the known shears, a large part of the machine parts used for adjusting the crank radius, and which constitute heavy masses, participate in the irregular movement of a top knife holder, and additional means are necessary for the compensation of adjustment effects.

In the shears shown in German Pat. No. 1,627,288, a top knife holder is connected with a bottom knife holder in the manner of a pair of pliers, through hinge bolts. The drive cranks are mounted in the side cheeks of the machine, and the pins, adjustable for the purpose of changing the crank radius, engage into the top knife holder from both sides. Upon adjustment of the crank radii, the cutting position is lost. To bring the top knife back into cutting position, the heavy side cheeks of the machine, with the transmission parts installed therein, must be adjusted. This requires expensive guides and adjusting elements.

SUMMARY OF THE INVENTION

In contradistinction to the known prior art shears, the objective of the present invention is to provide, in a flying shear with adjustable crank radius and serving to cut metal strip, fed thereto at a high running speed, into predetermined lengths, keeping the masses, to be accelerated twice and to be decelerated twice for each revolution of the shear drive, as small as possible, to provide that the adjustment of the crank radius can be effected rapidly and without play, and to provide that the machine parts or elements used for adjusting the crank radius are to be clampable and securable in the working position easily and quickly.

In accordance with the invention, this problem is solved in that the machine parts, effective to vary the length of the crank radius, are mounted inside the rotatable crank shaft so as to revolve therewith as a unit.

In a shear designed in accordance with the invention, all of the machine parts necessary for the adjustment of the shear trajectory, by adjustment of the drive crank radius, revolve uniformly. The masses of the entire shear to be accelerated and decelerated consist, independently of the adjusting system, only of the knives, knife beams, rockers and portions of the connecting rod masses. With a crank radius adjusting means embodying the invention, it is easily possible, without special counterweights, to obtain an extensive compensation of the inertia forces, which is a necessary condition for a particularly quiet running of the shear. Additional compensation and adjustment means are unnecessary, and there is a saving of expense, weight and costs.

In a preferred embodiment of the invention, the crank shaft is constituted by a drum rotatably mounted in the shear frame and carrying bearing flanges at its ends, and of a crank axle extending through the drum parallel to the axis of the drum and adjustably displaceable transversely of the drum axis. This crank axle forms, at its ends, crank cheeks carrying the crank ends from which, through connecting rods, there is derived the drive of a top knife beam carried by rockers.

An advantageous development of the invention also resides in that, on its one side, the crank axle is guided on pistons movable in cross bores forming hydraulic cylinders, these pistons engaging the inner wall of the drum, while, by sliding surfaces provided on its other side, the crank axle engages drivable adjusting wedges which, in turn, rest on wedge-guiding pieces fastened on the inner surface of the drum diametrically opposite the pistons.

According to one embodiment of the invention, the wedging surfaces of the adjusting wedges are arranged symmetrically inclined to each other and, into the adjusting wedges, the oppositely threaded, and preferably trapezoidally threaded ends, of an adjusting spindle are threaded, the adjusting spindle being drivable by a hydraulic motor secured on the crank axle. The hydraulic motor expediently can be anchored by means of a clamping device assembled with it coaxially and operable hydraulically.

In a development of the invention, the adjusting wedges have two wedging surfaces inclined toward each other, that is, they have a trapezoidal cross-section. Thereby, a greater adjustment range of the crank radius is obtained at an equal wedge displacement.

The mentioned forms of construction can be modified in the sense that the wedge faces of the adjusting wedges are arranged codirectional, and that the adjusting wedges are firmly connected with a piston rod of a hydraulic cylinder used for adjustment of the wedges. In this case, it is expedient to make the piston rod of the hydraulic cylinder, used for the wedge adjustment, fixable, as is the hydraulic motor in the previously mentioned design, by a hydraulically operable mechanical clamping device.

An object of the invention is to provide an improved flying shear, designed as a crank rocker shear, for crosscutting lengths of the strip. Another object of the invention is to provide such a shear in which the masses to be accelerated and decelerated during each revolution of the shear drive are maintained as small as possible.

A further object of the invention is to provide such a shear in which adjustment of the crank radius can be effected rapidly and without play.

Yet another object of the invention is to provide such a shear in which the machine parts used for the adjustment of the crank radius are clampable and securable in the working position easily and quickly.

For an understanding of the principles of the invention, reference is made to the following description of a typical embodiment thereof as illustrated in the accompanying drawings.

BRIEF DESCRIPTION OF THE DRAWINGS

In the Drawings:

FIG. 3 is a schematic representation of a shear design according to the invention, in a cutting position at maximum crank radius; and FIG. 4 illustrates the same shear design in non-cutting idle position at minimum crank radius.

DESCRIPTION OF THE PREFERRED EMBODIMENT

Figure 1:
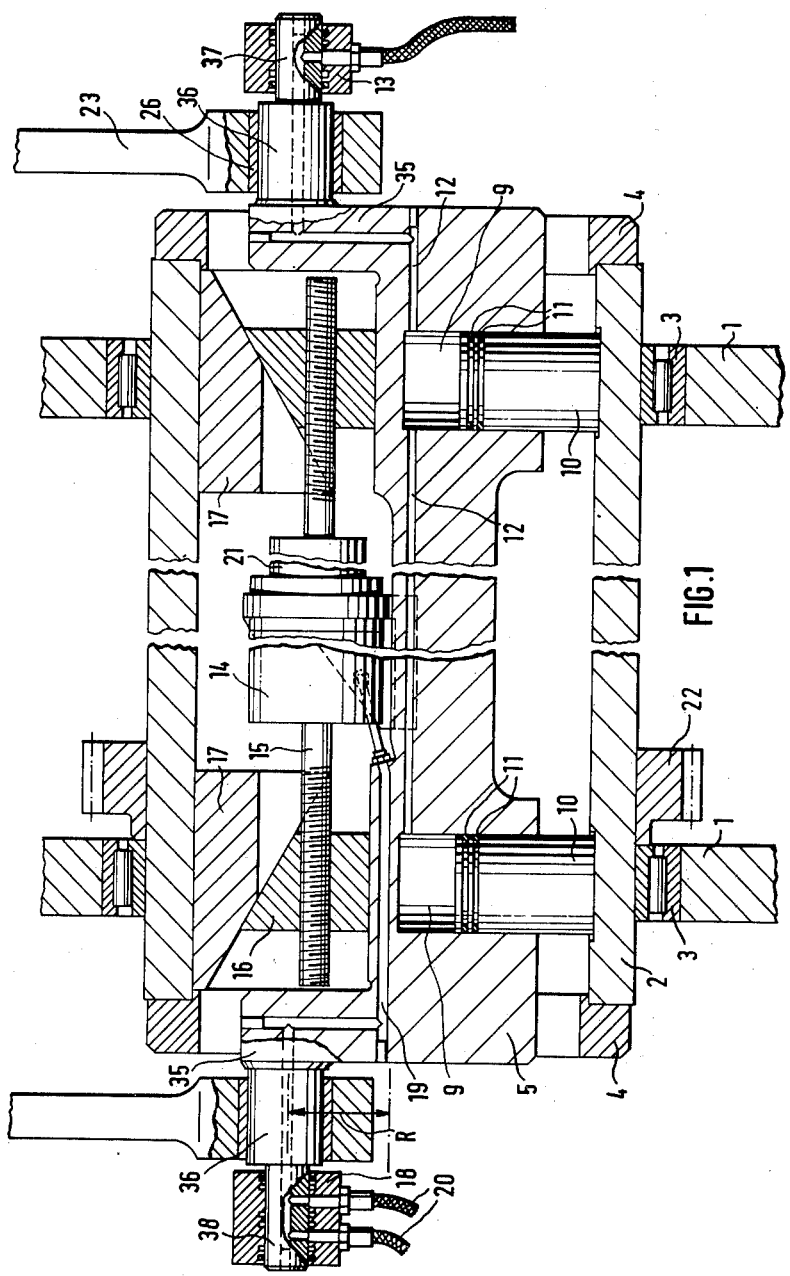
FIG. 1 is an axial sectional view through the crank shaft and the adjusting means thereof.
Figure 2:
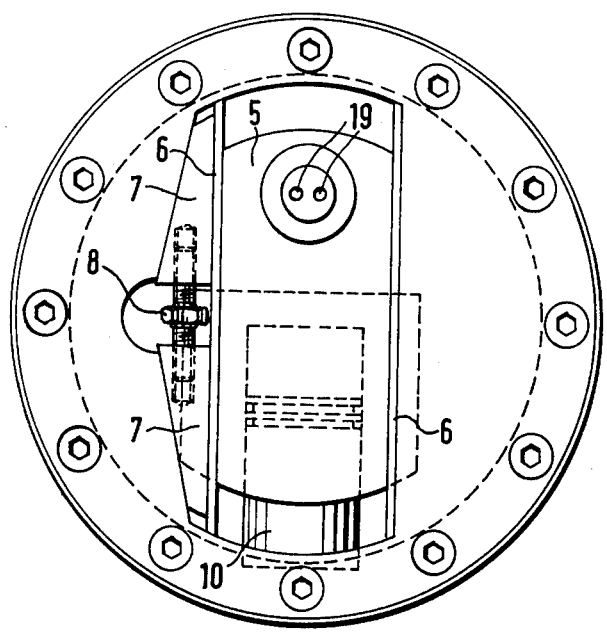
FIG. 2 is an end elevation view of the crank shaft.

Referring to the drawings, and particularly to FIGS. 1 and 2, a cylindrical drum 2 is mounted in anti-friction bearings 3 in a shear frame 1. Bearing flanges 4 are firmly secured, by screws, to the opposite ends of drum 1. A crank axle 5 extends through drum 2 and is mounted in bearing flanges 4 between guide pieces 6, shown in FIG. 2. Wedge strips 7 are guided in bearing flanges 4 and can be adjusted by means of a clamping screw 8, also shown in FIG. 2.

As best seen in FIG. 1, cross bores are formed in crank axle 5 and form cylinders 9 which receive clamping pistons 10 having piston packings 11. At its ends, crank axle 5 forms the crank cheeks 34 which carry pins 36, which may be integral with the crank cheeks. Thus, drum 2 forms the crank shaft together with crank axle 5 which is adjustable therein relative to the axis of drum 2 in a manner described hereinafter. The two cylinders 9 are interconnected by an oil bore or passage 12 formed in crank axle 5, and cylinders 9 are supplied with hydraulic fluid such as oil, through an oil inlet 13 rotatably mounted on a cylindrical, centered extension 37 of right hand crank pin 36, the inlet 13 being supplied with hydraulic fluid, such as oil under pressure, through the illustrated hose connection.

On the inner wall of drum 2, there are secured wedge guide pieces 17 and, between the wedge guide pieces 17 and sliding surfaces provided on crank axle 5, adjusting wedges 16 are arranged, one of which has a bore or passage with a left hand thread and the other of which has a bore or passage with a right hand thread. A hydraulic motor 14 is firmly connected with crank axle 5, preferably by being screwed thereto, and an adjusting spindle 15 is firmly connected to the rotor of motor 14. The respective ends of spindle 15 extending in opposite directions from motor 14 are formed with a right hand trapezoidal thread and a left hand trapezoidal thread, and the threaded ends of adjusting spindle 15 are screwed into the threaded bores of adjusting wedges 16.

Hydraulic motor 14 is connected with a hydraulic unit, which has not been shown, through an oil inlet 18 rotatably mounted on a cylindrical, centered extension 38 of left crank pin 36, as shown in FIG. 1, and has two connections for two pressure hoses 20 which communicate with two hydraulic fluid or oil bores formed in crank axle 5. A hydraulically operated, mechanical clamping device 21 is operatively associated with hydraulic motor 14.

A drive wheel, in the form of an annular gear 22, is secured on drum 2. Through connecting rods 23 having heads engaged with crank pins 36 through bearings 26, crank axle 5 is connected with a top knife beam 24 or with beam-supporting rockers 25 of the flying shear, as shown in FIG. 3, to drive the shear. The bearings 26 may be sliding bearings or anti-friction bearings.

Top knife beam 24 carries a top knife 27 and is firmly connected with the rockers 25 which are connected to cranks 28 of a cutter drive crank shaft 29. Rockers 25 mount a bottom knife beam 31 sliding in guides 30, and to which a bottom knife 32 is secured by screws or the like. Supporting rods 33, which are adjustable in height, engage at the bottom knife beam 31.

Depending on the different sheet lengths to be cut, the speeds of rotation of a continuous flying shear are different, for a certain feeding speed of the metal band or strip. If the horizontal knife speed for different sheet lengths, that is, different cutting locations, is to be adapted to the constant speed, a variation of the trajectory 34 (FIGS. 3 and 4) within a certain range is necessary, and this is obtained by varying the drive crank radius or, in the present case, the crank radius R of crank axle 5.

To adjust the crank radius R correlated to a certain sheet length, the hydraulic fluid pressure in cylinders 9, if it had an operating magnitude before, is greatly decreased, so that adjusting wedges 16 can easily be moved into a predetermined position by forward or reverse running of hydraulic motor 14, through the medium of the adjusting spindle 15. Because of the low hydraulic fluid pressure, it is possible, at an appropriate hydraulic control, to set the desired radius R in a short setting time. Thereafter, simultaneously with the disconnection of hydraulic motor 14, clamping device 21 which, during operation of hydraulic motor 14 had been hydraulically relieved, becomes operative, so that it now again mechanically retains adjusting spindle 15 and secures it against rotation. The pressure in cylinders 9 is subsequently again increased so that, in every working situation of the shear, the crank axle 5 is hydraulically clamped securely and without play against drum 2 through adjusting wedges 16 and wedge guide pieces 17. Due to the pressure prevailing in cylinders 9, clamping pistons 10 engage the inner surface of drum 2. Utilizing clamping screw 8, wedge strips 7 (FIG. 2) are adjusted so that no play exists between them, the guide pieces 6, and the crank axle 5.

The largest trajectory 34 is necessary at the largest system-related cutting length, and this is obtained with the largest crank radius R of crank axle 5. At the highest forward speed of a band or strip to be cut, the shear drive runs at the lowest speed of rotation.

The smallest trajectory 34, shown in FIG. 4, is necessary at the shortest cutting length and is obtained at the smallest crank radius R of crank axle 5. The shear drive 29 then runs at its highest speed of rotation, again at the greatest forward speed.

In a basic length cutting range, whose one limit is given at the longest cutting length by the largest trajectory 34 (FIG. 3) at the lowest speed of rotation of the shear, while its other limit is given at the shortest cutting length by the smallest trajectory 34 (FIG. 4) at the highest speed of rotation of the shear, bottom knife 32 is always held in the cutting position, so that a cut occurs during every revolution of the shear drive.

By lowering supporting rod 33, bottom knife 32 can be lowered far enough so that no cut can be made. If, in this way, an idle stroke is run after each cut, the respective set basic cutting length is doubled, after two idle strokes is tripled, after three idle strokes, is quadrupled, etc. That is, any multiples of the basic cutting lengths can be cut.

While a specific embodiment of the invention has been shown and described in detail to illustrate the application of the principles of the invention, it will be understood that the invention may be embodied otherwise without departing from such principles.

What is claimed is:

1. In a flying shear, designed as a crank rocker shear, for crosscutting metal strips continuously fed thereto, including a shear frame and a crank and a crank shaft rotatable in the shear frame and effecting entrainment of strip cutting knives in the direction of strip movement, and return of the cutting knives in the opposite direction, with the crank radius being adjustable in accordance with different cutting lengths of the strip, the improvement comprising, in combination, said crank shaft having an interior recess therein; a crank axle mounted in said recess and guided therein for adjustment rectilinearly of a diameter of said crank shaft; means connecting said crank axle to said strip cutting knives; and adjusting means operatively associated with said crank axle and operable to adjust said crank axle rectilinearly of said diameter of said crank shaft to adjust the crank radius, mounted in said interior recess and rotatable as a unit with said crank shaft.

2. In a flying shear, designed as a crank rocker shear, for crosscutting metal strips continuously fed thereto, including a shear frame and a crank and a crank shaft rotatable in the shear frame and effecting entrainment of strip cutting knives in the direction of strip movement, and return of the cutting knives in the opposite direction, with the crank radius being adjustable in accordance with different cutting lengths of the strip, the improvement comprising, in combination, said crank shaft having an interior recess therein; adjusting means, operatively associated with said crank axle and operable to adjust the crank radius, mounted in said interior recess and rotatable as a unit with saod crank shaft, said crank shaft being constituted by a cylindrical drum rotatably mounted in said shear frame and having bearing flanges at its opposite ends; a crank axle extending through said drum parallel to the drum axis and adjustable displaceable in the drum transversely of the drum axis; crank cheeks at the ends of said crank axle carrying crank pins; a top knife beam, rockers carrying said top knife beam; and connecting rods interconnecting said crank pins and said rockers for driving said top knive beam.

3. In a flying shear, the improvement claimed in claim 2, including bores formed in said crank axle on one side thereof and defining hydraulic cylinders; pistons in said cylinders guiding said crank axle and engaging the inner wall of said drum; sliding surfaces formed on the opposite side of said crank axle; drivable adjusting wedges engaged with said sliding surfaces; and wedge-guiding pieces engaged by said drivable adjusting wedges and secured on the inner wall of said drum diametrically opposite the points of engagement of said pistons with the inner wall of said drum.

4. In a flying shear, the improvement claimed in claim 3, in which the wedge faces of said drivable adjusting wedges are arranged symmetrically inclined to each other; an adjusting spindle having oppositely threaded ends threadedly engaged in said adjusting wedges; and a hydraulic motor secured on said crank axle and in driving connection with said adjusting spindle.

5. In a flying shear, the improvement claimed in claim 4, in which the ends of said adjusting spindle are oppositely threaded trapezoidally.

6. In a flying shear, the improvement claimed in claim 5, including a hydraulically operable clamping device coaxially assembled with said hydraulic motor and operable to clamp said hydraulic motor against movement of said adjusting spindle.

7. In a flying shear, the improvement claimed in claim 3, in which said adjusting wedges have a trapezoidal cross-section providing two wedge faces inclined relative to each other.

8. In a flying shear, the improvement claimed in claim 3, in which the wedge faces of said adjusting wedges extend in the same direction; and a hydraulic actuator including a cylinder and a piston slidable in said cylinder and fixedly connected with said adjusting wedges to adjust said wedges.

9. In a flying shear, the improvement claimed in claim 8, including a hydraulically operable mechanical clamping device operatively associated with said piston rod and operable to fix said piston rod against movement.

* * * * *